United States Patent [19]

Nobles et al.

[11] Patent Number: 4,820,167
[45] Date of Patent: Apr. 11, 1989

[54] ELECTRONIC SCHOOL TEACHING SYSTEM

[76] Inventors: Anthony A. Nobles, 3134 One 45th St. #13, Gardina, Calif. 90249; Verne H. Nobles, 1505 Purdue #305, Los Angeles, Calif. 90025; Jon H. Fleming, 5816 Still Forest Dr., Dallas, Tex. 75252; Charles T. Terrell, 4817 Auburndale, Dallas, Tex. 75205; Alexander K. Lai, 6911 S. Lacienega Blvd., Los Angeles, Calif. 90045

[21] Appl. No.: 3,076

[22] Filed: Jan. 14, 1987

[51] Int. Cl.$^4$ ............................................. G09B 7/00
[52] U.S. Cl. ................................... 434/336; 434/335; 434/317; 434/307
[58] Field of Search ............... 434/336, 335, 317, 178, 434/307

[56] References Cited

U.S. PATENT DOCUMENTS

| | | | |
|---|---|---|---|
| 4,159,417 | 6/1979 | Rubincam | 340/706 |
| 4,622,013 | 11/1986 | Cerchio | 434/118 |
| 4,636,174 | 1/1987 | Andersen et al. | 434/335 |

*Primary Examiner*—Leo P. Picard
*Attorney, Agent, or Firm*—Hubbard, Thurman, Turner & Tucker

[57] ABSTRACT

An electronic school teaching system includes a data collection computer, teacher's computers and a student's electronic and test units. The data collection computer is located in the school's administration office and connected to a plurality of teacher's computers located in a corresponding plurality of school rooms, and a plurality of student's read and test units are connectable to each of the teacher's computers. The data collection computer receives student related data including textbook updates to the teacher's computers. The teacher's computers are connectable to the student's read and test units for writing homework assignments, tests, and grades and reading student identification, homework, and test information. The student's read and test units include electronic textbook memory modules, one for each course, and a memory module for receiving the homework assignments, an open book size housing for a display, keyboard, and microprocessor. The display shows left and right pages of the textbook. The keyboard includes left and right page turning keys in the upper left and right corners, numeric keys for page and chapter location, alphabetical keys for answering test questions, and calling up each textbook, and true, false, yes, and no keys for answering questions conveniently located around the border of the textbook. The operation of the unit simulates the use of a normal textbook; thus, the level of difficulty in learning to use the unit is minimal.

37 Claims, 9 Drawing Sheets

BOOKMODE QUESTION & ANSWER

FIG. 8c

LOCK OUT FLOW CHART

FIG. 9b

FIG. 9a — TEST QUESTION FLOW CHART

FIG. 10 — RS-232 FLOW CHART

ELECTRONIC SCHOOL TEACHING SYSTEM

This invention relates generally to educational systems, and more particularly to a system for teaching substantially an entire curriculum to a large number of students in all grade levels of public schools or the like.

BACKGROUND OF THE INVENTION

Public school systems have operated in substantially the same manner for many years. A student, particularly from the middle school through the college levels, has at least one textbook for each major subject, and normally carries as many as six subjects at one time. Each teacher typically has a number of classes covering the same subject, and frequently all of the classes for that subject are taught in the same classroom. Thus, the students go from one classroom to another on a predetermined schedule to take the different courses. Each of the courses generally includes a study portion and a test portion. The study portion includes classroom study from a textbook supplemented by handouts from the teacher and homework assignments consisting of reading assigned pages of the textbook and practice questions with math problems for courses in mathematics. The test portion includes test questions for closed book and open book examinations. The questions are either supplied by the teacher as handouts or provided by the textbook. The questions are customarily answered by multiple choice, true/false, or yes/no selections.

There are many problems associated with existing public educational systems. These problems stem from but are not limited to the increasing cost of textbooks, the obsolescence of the textbooks, and the excessive workload imposed on the teachers by the paper blizzard created in the preparation of homework assignments and tests, and the grading thereof. Data compilation of the grades, attendance records and other administrative matters and the preparation of the reports thereof to the school administrative office requires additional teacher time. As a result of these excessive workloads, the time remaining for teaching, particularly in the larger classrooms, is limited.

A particular difficulty for teachers exists where students of differing learning abilities must be taught in the same relatively large class. It is accepted that it is desirable to match a student's particular learning ability with the difficulty of the course to properly motivate the student for maximum learning, which is, of course, of primary importance. Also, any convenience to the student, or efficiency in the learning experience which promotes learning is an important consideration in the teaching process.

SUMMARY OF THE INVENTION

The present invention is concerned with a system having as its objects the alleviation of the above-mentioned problems, namely a system for reducing the costs of textbooks, the need for using obsolescent textbooks and the teacher generated paperwork. The latter two objects facilitate the learning process for a large number of students. The system includes, a central school computer for outputting general information to a plurality of classroom computers, one for each teacher, a read and test unit, one for each student, and preferably a home station including at least a recharging power supply and for best results a printer. The overall system is made possible by a small, fully portable unit which is assigned to each student and which replaces all textbooks. The unit has ports for plug-in electronic read only memory modules, each of which contains the information of a textbook, including practice test questions and answers, and for a memory storage unit for storing homework assignments, additional technical material and test materials from a teacher's personal computer.

The student's unit includes at least a "read" mode and a "test" mode. In the read mode, text material is read out page by page under the control of the student. The student's unit is a highly compact, portable device approximately the size of a single school textbook. The unit includes a display screen, typically a liquid crystal screen, approximating the size of an open book. The unit has an input/output port for interfacing with a computer. commonly referred to as a personal computer, and with a printer. The student unit display preferably displays two standard pages of textbook at a time in either alpha numeric or graphic form. The two pages are the left and right pages normally viewed at one time in an open textbook. The unit includes totally dedicated control buttons for simplification of use, has a rechargeable battery system, and sufficient stand by power to retain internal random access memory for a substantial length of time during power down.

The unit is in the sole possession of the student, who transports the unit from one classroom to another. In each classroom the student couples the unit to an input-output connector post for the personal computer of the particular teacher to receive both homework assignments and additional information, such as tests or notices from the teacher, and to enter homework and test answers into the computer. With the unit storing all of the textbooks and temporary data which the student takes, all information required by the student for a semester's work is continuously available to the student. Any textual information can be ready by the student in any classroom with the unit plugged into the school power supply, or in any convenient location with the dc battery supply being used. At home, house power supply can be used to power the unit and to recharge the batteries. Any text material can be highlighted for printing together with other information selected by the student when the unit is connected to a printer.

In the test mode, questions are presented with either multiple choice, true/false, or yes/no answers. The student may readily switch from read mode to test mode so that each question can be answered by reference to textual material, if desired. The questions of the test mode can be reviewed and answers changed as desired. Where appropriate, the student may be required to "turn in" an answer by pressing a designated key, at which time his answer is locked in the student's unit and cannot thereafter be changed by the student. At that time, if desired, the correct answer together with any prompting information can be displayed so that the student gets immediate feedback of the correct answer, as well as the total score of the test. The system can also perform timed testing, such as providing a minimum lapse time to take a test, can present textual material in a predetermined timed manner so that reading and comprehension skills can be assessed, and can also present textual information at a controlled rate to teach speed reading skills, followed by comprehension tests.

During the test reading mode, the student has the capability to underscore selected passages for emphasis, and mark selected passages for printout. The student's unit is adapted to output to a standard printer as well as to a standard personal computer. Each student unit may be provided with a discrete serial number for purposes of reporting attendance and test results to the teacher's personal computer. In addition, during interface with the teacher's computer, homework assignments, including text and practice test materials, or graded tests can be input to the unit. Of course, homework assignments, including text-like reading material, can also be provided at this time.

In accordance with a method of the present invention, textbooks for the various student courses in the school system are adopted using conventional procedures. However, rather than the textbooks being in the printed and bound form, the course subject matter is recorded on an electronic media, preferably an EPROM or ROM. This electronically recorded textbook is then plugged into the individual student's unit to provide the student with the basic course material for the semester. The textbooks are preferably in the form of modules, one for each textbook, but can be in the form of electronic data input into internal random access memory in the student unit by a central data processor or the teacher's personal computer. In either form, the procedure is made significantly less expensive than the conventional method, of providing textbooks by materially reducing shipping and storage costs in addition to basic printing costs, thus permitting either significantly reduced initial costs. Further, either form can be conveniently and quickly updated to provide a shorter obsolescent cycle. If the data is stored on an erasable and rewrittable device, such as EPROM modules or internal dynamic random access memory modules, the textbooks can be updated in part to maintain such courses as history and science as current as possible with minimum costs.

At predetermined intervals, either daily, weekly or as otherwise selected by the teacher, the student couples the student's unit to an I/O port of the teacher's personal computer to receive such data as homework assignments, practice exams, or gradable exams. The student is then free at his choice of time and place to call up the text for the individual subjects to complete the homework including practice or grade tests. This can be done in study hall, the school yard, on the bus, or any other place of the student's choosing, including the units home work station which preferably includes at least a recharging power supply and for best results a printer. The student may thus select the course for study, and cover whatever reading material is assigned. Then upon entering the test mode, the student may do practice exams, or by using an exam with the lockout mode, can take gradable open book exams at home or away from the classroom.

Upon entering each class, the student will plug into the teacher's personal computer so that his attendance can be automatically recorded by the computer reading the serial number of the unit. Any completed homework for credit or grading can then be read out by the teacher's personal computer, and can be replaced by any additional handouts or instructions from the teacher for the upcoming class or for homework. If desired, the teacher can also provide a classroom examination to be completed during the class. After entering the answer to each question the lock out mode may be used to lock in the answer. The correct answer is supplied the student after each answer is selected. However, the answers may be turned in for grading by the teacher's personal computer at the end of the class. If funds permit, an input/output port can be provided at each student desk, so that the student's unit would be on-line during the class, but this is not necessary where the expense is prohibitive. As the student travels from classroom to classroom, and teacher to teacher, and the procedure repeated for each class attended, attendance as well as homework and/or test scores are available for input as desired from the teacher's personal computer to a central administration computer where data for the entire school system may be collected.

In accordance with another important aspect of the invention, a number of different homework or test examples of different degrees of difficulty can be provided in the computer. A level of difficulty which the teacher deems appropriate for a given student can be input from the teacher's personal computer to the individual student's unit. The teacher's personal computer can then randomly select for tests, or systematically select for homework, those problems which fall within the chosen level of accomplishment so that the course difficulty can be tailored for each individual student according to the teacher's judgment as to what would be most appropriate.

BRIEF DESCRIPTION OF THE DRAWINGS

Other objects and features of the invention will become more readily apparent from the following detailed description when read in conjunction with the accompanying drawings in which.

DETAILED DESCRIPTION OF A PREFERRED EMBODIMENT

An electronic teaching or instruction system 10 (FIG. 1) is disclosed for handling the paper work involved in running a school system. The system provides the school system administrators at each level a paperless data input/output communication link directly to the classroom without teacher involvement for obtaining administrative reports such as, for example, attendance and grade reports, and for providing teacher and student information including text updates and notices. Thus, the system frees the teachers substantially from their administrative duties. But that is not all, the system provides the teacher with a paperless means of communication with the students and their parents. For example, the teacher can prepare and input assignments, tests, and additional course information for the student into the system from either inside or outside the classroom. By eliminating the need for textbooks, the student benefits by not having to carry and store textbooks; each student is provided a portable electronic read and test device.

The portable, electronic read and test (R&T) device is a light portable device which incorporates in memory the textbooks for the courses mandated for or selected by the student. The use of electronic (semiconductor) textbooks reduces the cost of textbooks, and provides a means of updating quickly and cheaply the textbooks. Thus, the need for utilizing obsolescent textbooks is obviated. The student can plug the device into the teacher's computer to record his attendance and receive test questions and/or lesson assignments for the day. Upon receiving the test questions and/or assignment instructions the student unplugs his device and is ready to take the test or do his homework.

In taking a test the student can read the question, select answers tentatively, review his answers, modify them until acceptable to him, and then enter the answers permanently. When the answers are permanently entered, the student is locked out from the answers. The device is again plugged into the teacher's computer, the answers graded, and the score recorded. During grading the correct answers are provided for incorrect answers. The R&T device is then disconnected, and the student can review the results. If desired, the student can plug the unit into a printer for printing out the questions, answers, and results.

In doing the homework, the student can either in or outside the classroom (home or library, for example), call up the assigned pages for reading a page at a time. After reading a page, a new page is made ready for reading by pressing a forward key or return can be made to a preceding page by pressing a back key. During reading, important material may be highlighted for subsequent printout. Also, any questions contained in the test may be answered and the answers checked with any answers contained in the test. The device is then plugged into the teacher's unit for entering the results of the homework. A speed reading option is provided by the R&T device. By selecting the speed reading mode the test material is scrolled across the display at a rate selected by the student.

The electronic R&T device is carried by the student from one class to another for repeating the process for each subject. Each time the device is connected to the teacher's computer the serial number, for example, of the R&T device is recorded for student identification.

The electronic books for the read and test device may also be, for example, detachable semiconductor memory modules. The modules provide the system another means for reducing the cycle lead time for producing newly approved textbooks and for updating the textbooks to keep them substantially current with new developments. The detachable module provides a convenient way of changing electronic textbooks contains in the R&T device. The reduction in textbook cost and storage cost again is substantial.

Thus, the electronic teacher or instruction system includes an administration station 12 (FIG. 1) having a computer 14 for collecting or outputting or both information to other data collection and distribution stations as required. The computer 14 may be connected to a printer 16 for printing information documents such as, for example, attendance reports, and failure rate information.

Figure 1:
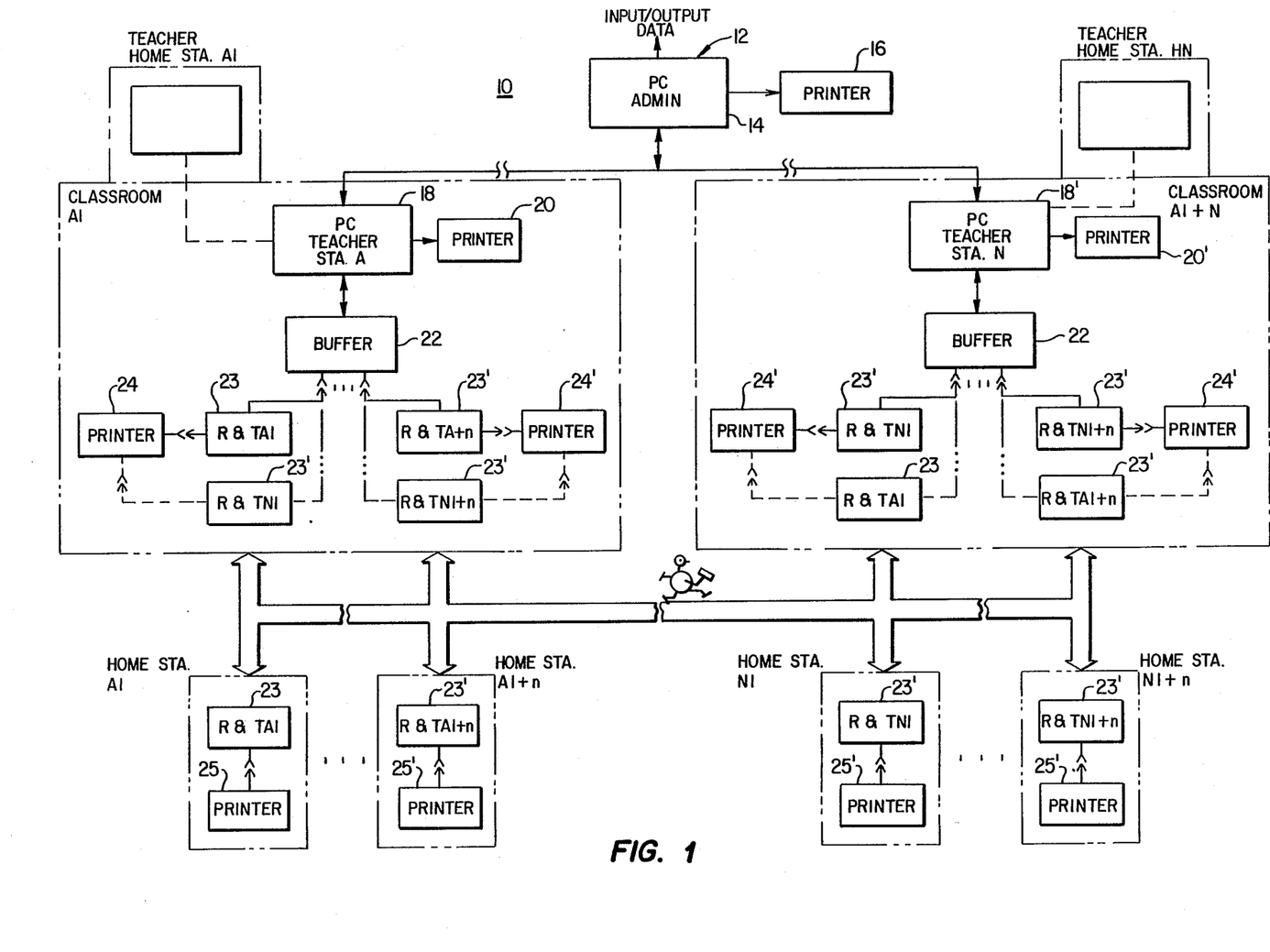
FIG. 1 is a block diagram of the electronic school teaching system of the invention.

The administration station 12, which may be, for example, centrally located in the school, is connected to a plurality of classrooms A1 through A1+n. Each classroom includes a teacher controlled computer 18. Primed reference numbers will be used to designate identical but additional elements. The teacher computer 18 is accessible to the teacher in the classroom. Thus, the teacher may input homework assignments including questions and answers as well as test questions and answers into the computer memory, and assign to each student assignments tailored to the student's capabilities.

The computer includes in memory student identification and a look up table for matching student identification for outputting the information to the student and for identifying his response input. The computer also includes a grading means which may include, for example, a latch type comparator having the correct answers on one side and the student's answers on the other for comparison and outputting logic states to indicate matching and non-matching answers. The results are recorded in memory for each student and outputted to the student for information purposes.

Further, the computer is programmed for time testing. With the R&T unit attached to the computer for tests, call up of the first questions starts a timer connected to the computer's clock. When the time expires, an instruction is issued to lock in the answers entered and lock out the entry of additional answers. In addition outside (home) stations A1 through A1+n equipped with computers may be used to provide the teacher outside the classroom access to the teacher controlled computers for preparing or modifying the teacher computer input information.

Each teacher controlled computer 18 is connected to a printer 20 which may be accessed by the teacher and students for printing desired data contained in the computer memory bank. The computer 18 is connected to a buffer 22 which includes a plurality of buffer registers for storing a corresponding number of student inputs for processing by the computer 18. The buffer 22 includes a corresponding plurality of connectors for connecting a corresponding plurality of electronic read and test devices 23 which might include the simultaneous connection of any preselected number or all of the electronic read and test (R&T) devices A1 through A1+n. Each electronic R&T device may be connected to a printer 24 or to one printer of a number of printers less than the number of devices, or to the teacher controlled computer printer. Each electronic read and test device has read and test modes of operation hereinafter described in detail.

With the electronic system so constructed, each electronic read and test device of the R&T A1+A1+n through R&T N1+R&T N=n devices, hereinafter referred to as the device, may be transported from classroom to classroom for plug-in to the teacher controller computer 18 for receiving the homework assignments, questions, answers, and test questions for use in the read and test modes. In addition, the students have stations A1 to A1+n through N1 to N1+n outside the classrooms (homework stations) to which the devices may be carried for doing their homework. Each home station should include a battery charger (not shown) for the device and for best results a printer 25. The results of the homework can be stored in the device for subsequent turn in through the teacher controller computer 18.

The electronic read and test device (device) 23 (FIG. 2) includes a light, thin housing 26 having an apertured top for a liquid crystal display 27 and margins for a keyboard 28 and a side 29 having a port connector 48 for six ports, a dc connector 30 and ac/dc power switches 31. A suitable material for the housing 26 is a tough, durable, thermosetting plastics.

Figure 2:
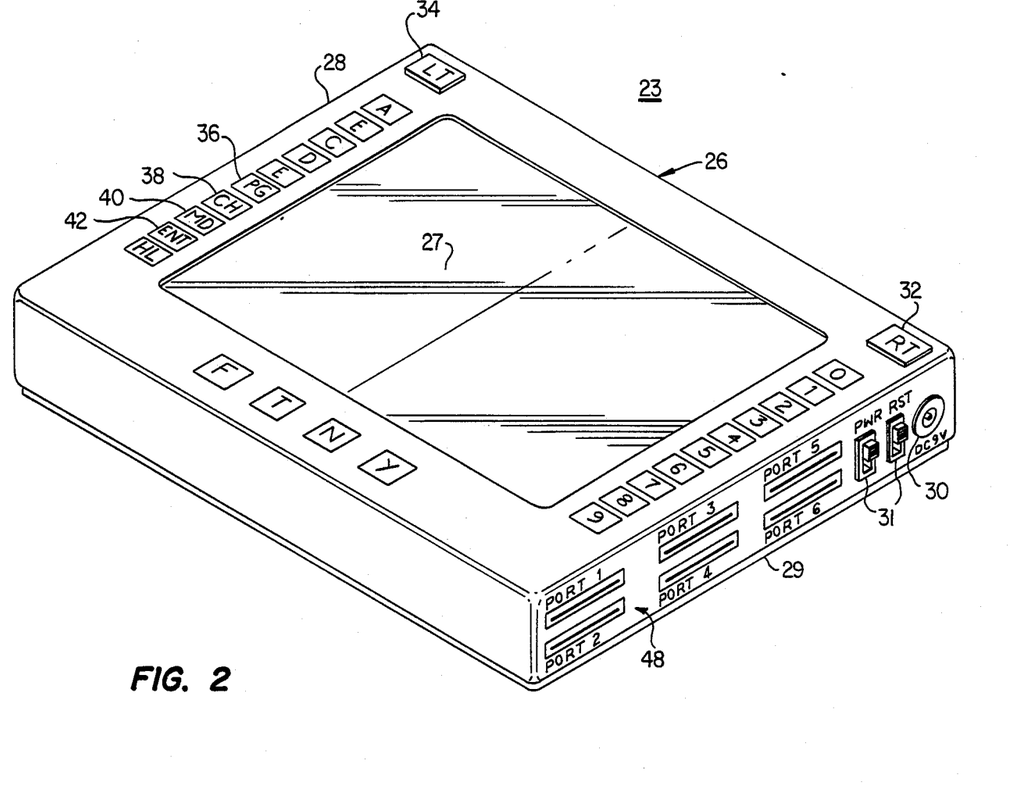
FIG. 2 is an isometric view of the electronic book device.

The keyboard 28 includes right and left page turn keys 32 and 34 located in the upper right and left corners of the housing margins. With the page turning keys in this location the device housing can be grasped with the fingers beneath the housing and the thumbs positioned to engage the right and left page turn keys. On the right margin the number keys 0-9 are located, on the bottom margin the false (F) key, true (T) key, no (NO) key, and yes (Y) key are located for use in answering true/false type questions as well as questions having yes/no answers; and on the left margin the letter keys are located. The letter keys include: keys for the letters A through E for use in selecting the electronic textbook in the book read mode and selectively answering multiple choice questions having up to five choice answers in the test mode; a page key 36 for use with the number keys to call up a page by its number; a chapter key 38 for use with the number keys for calling up a first page of a chapter; a mode selection key 40 for switching back to the main menu at any time; and an enter key 42 for entry of key selected information into the device.

Figure 3:
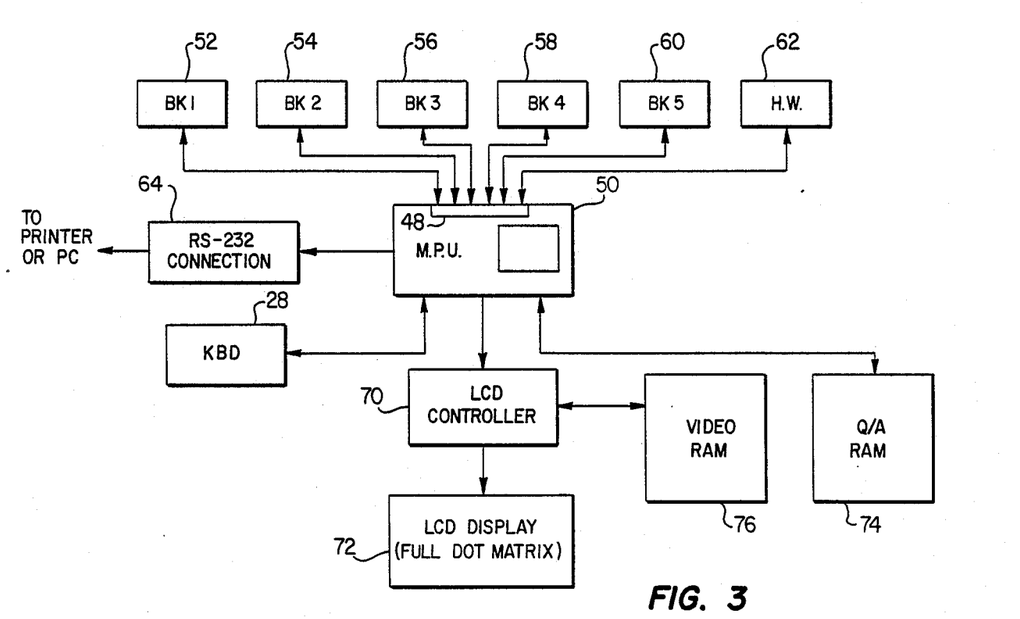
FIG. 3 is a block diagram of the electronic book device.

The electronic read/test device (device) 23 (FIG. 3) includes a microprocessing unit 50 having a port connector 48 (FIG. 4) for connection to a plurality of electronic book modules 52, 54, 56, 58, and 60, and to a homework module 62 (FIG. 3). A suitable microprocessing unit is an 8051 MPU manufactured by Oki Semiconductor Inc. It will be appreciated by those persons skilled in the art that any number of ports can be chosen depending upon the number of textbooks required for the courses chosen. Each electronic textbook is a suitable semiconductor type memory containing the material of the textbook in a format compatible with the device. Each textbook memory preferably is a read only memory (ROM), PROM, EPROM, or EEPROM module which has permanent or semi-permanent data retention capability.

The homework module may be, for example, a dynamic random access memory (DRAM). The keyboard 28 is connected to the MPU for inputting data to the MPU. The MPU includes an internal random access memory (RAM) for receiving keyboard commands and a program ROM.

The MPU 50 has output terminals connected to: a standard RS-232 communication port 64, for connecting the MPU to either the printer 24 (FIG. 1) or to the teacher computer 18; a liquid crystal display (LCD) controller 70 (FIG. 3) for driving a liquid crystal display 82; and to an additional question/answer RAM 74 for storing student and teacher questions, corrected answers and grades. A suitable LCD controller and LCD are, respectively, a 6255 LCD controller and an MPD LCD, both manufactured by Oki Semiconductor Inc. A video RAM 76 is connected to the LCD controller 70 for receiving the data and maintaining the data during the display time period for display by the LCD.

Figure 4:
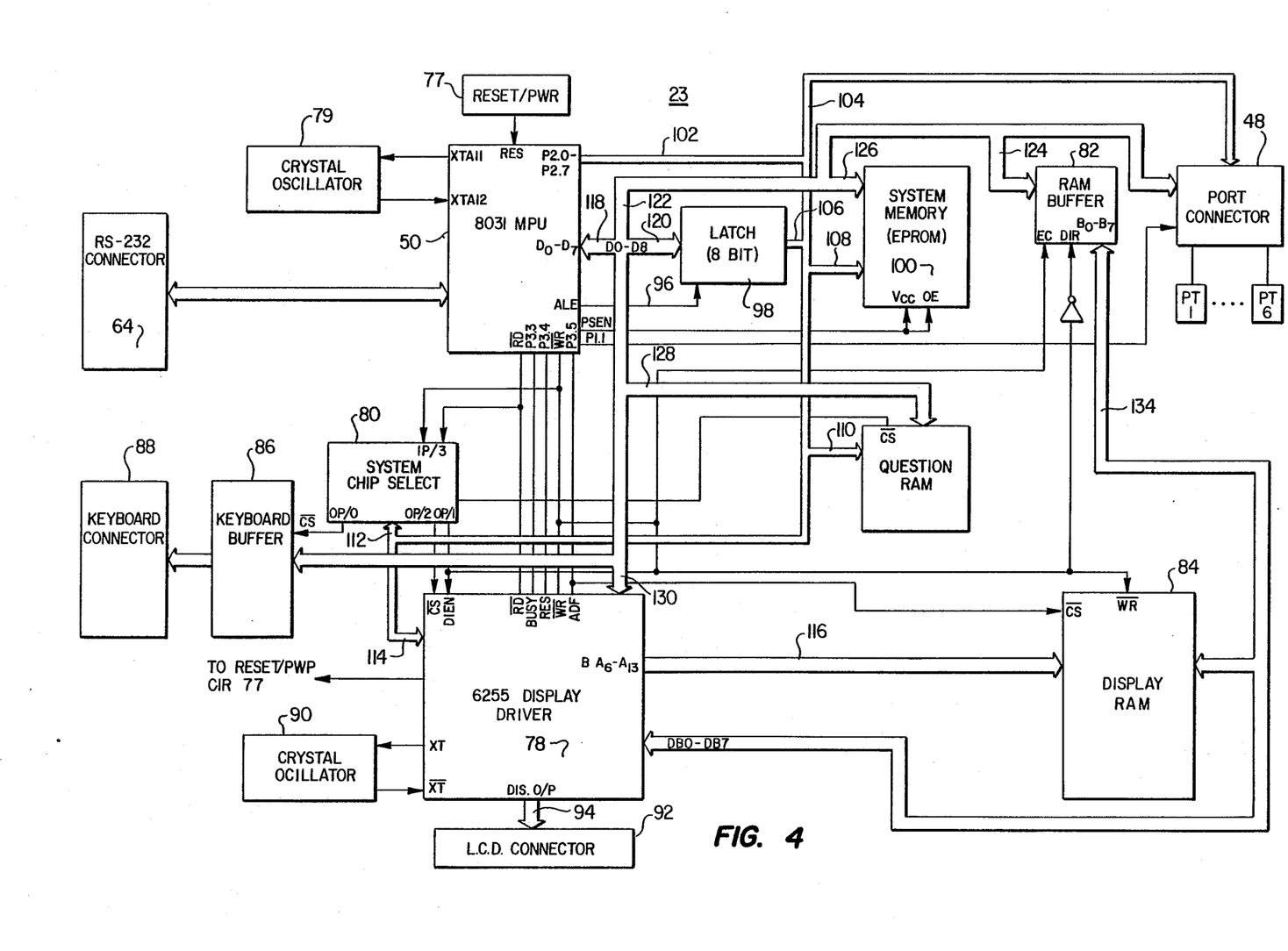
FIG. 4 is a schematic view showing in greater detail the electronic book device.

Referring now to FIG. 4 for a more detailed description of the device 23. A MPU 50 includes a reset/power down determining circuit 77 connected to reset terminals of the MPU 60 and a display driver 78 of the LCD controller 70 to reset the internal registers of both the MPU and the LCD driver 78 and to start the MPU from a power down condition resulting from a cold start or power failure. A crystal oscillator 79 is connected to the MPU for producing the MPU operating clocking frequency. The RS-232C communications port 64 is attached to the MPU.

The MPU has its control terminals (/RD, P3.3, P3.4,/WR, and P3.5) connected as shown to the system chip select (CS) 80, LCD driver 78, data RAM buffer 82, and display RAM 84.

The system chip select 80 is a function of the system program and selects each output according to the systems status. The chip select chip 80 control lines are connected as shown to the LCD driver 78, system RAM buffer 82, display RAM 84, and keyboard buffer 86.

The keyboard buffer 86 is connected by a bus to the keyboard connector 88 for connecting the keyboard 28 to the buffer 86.

The display driver 78 has its own crystal oscillator 90 for receiving LCD clocking pulses at a frequency compatible with the LCD 72. The LCD driver is connected to an LCD connector 92 for connection to the LCD 72. The LCD 72 receives the data for display through bus 94 from the display driver 78.

The address latch enable (ALE) terminal of the MPU 50 is connected by strobe lead 96 to a latch 98 to indicate that the address bus is now valid for the beginning of a bus cycle. The system latch demultiplexes the lower 8 bits of the address bus from the data bus.

A system EPROM 100 has its control terminals (VCC and OE) terminals connected to the PSEN terminal of the MPU and the port connector 48 has its control terminals connected to the MPU 50 for port selection.

The upper address terminals (A8-A15) of the MPU are connected by bus 102 to bus 104. The lower address (A0-A7) terminals of latch 98 are connected by bus 106 to bus 104 for connecting the addresses of terminals A0-A15 to bus 104. Bus 104 is connected at its upper end to corresponding address terminals of the port connector 48 and to busses 108, 110, 112, and 114, respectively, to corresponding address terminals of the system EPROM 106, question RAM 68, chip selector 80, and LCD driver 78.

The LCD display driver 78 has its B address terminals A0-A13 connected by bus 116 to corresponding terminals of the display RAM 84.

The MPU 50 data terminals D0-D7 are connected through bus 118 to latch 98 for inputting the data and address information to the latch for demultiplexing. The demultiplexed data signals are output on bus 120 to bus 122. Bus 122 is connected at its upper end to corresponding data input terminals of the port connector 48, and to busses 124, 126, 128, and 130, connected respectively to corresponding data terminals of the RAM buffer 84, system EPROM 100, question RAM 68, LCD driver 82, and keyboard buffer 86.

The data RAM buffer 82 has its B0-B7 terminals connected by bus 134 to corresponding terminals of the display RAM 84, and LCD driver 78. As the LCD 72 has not display linger time, the display RAM 84 is provided for producing continuously the data signals for display by the LCD during the time of selection.

Figure 5A:
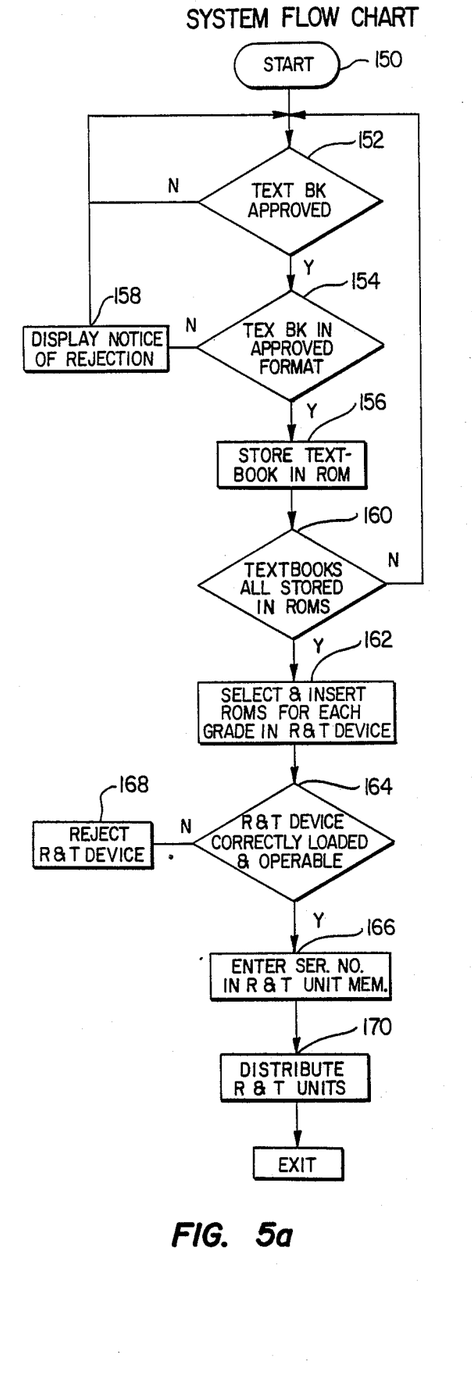
FIGS. 5a and 5b are flowcharts for system initialization.

The operation of the system can be described best in connection with flowcharts. At the time of system introduction into a school system or at start 150 (FIG. 5) a decision 152 is made whether a proposed textbook has been approved for use. If YES, a decision 154 is made whether the textbook is in a preselected format compatible with the read and test device, else the textbook is rejected. If the textbook is in a correct format an instruction 156 is issued to store the textbook into a suitable read only memory, else an instruction 158 is issued to display a notice of rejection and return is made to start. Next, a decision 160 is made whether all the textbooks are in ROMs. If FALSE, the process is then repeated for each course of the curriculums and until a preselected number of ROMs have been prepared for each course. Next, an instruction 162 is issued to select and insert ROMs containing the textbooks for the courses of each grade into the ports of the read and test devices, and a decision 164 made whether each read and test device is loaded with the correct courses for its grade and operable. If the decision is YES, an instruction 166 is issued to enter a serial number into the memory of the unit for student identification to distribute the read and test device to the user schools for connection to the teacher's computer, else an instruction 168 is issued to reject the device. After the serial number is entered an instruction 170 is issued to distribute the R&T units.

Thereafter, the school administrator can communicate through its computer with the teacher's computer for receiving information from and inputting information into the teacher's computer. Information received from the teacher's computer includes attendance records, and grades; information input into the teacher's computer includes textbook updates and errata sheets for the read and test devices.

Figure 5B:
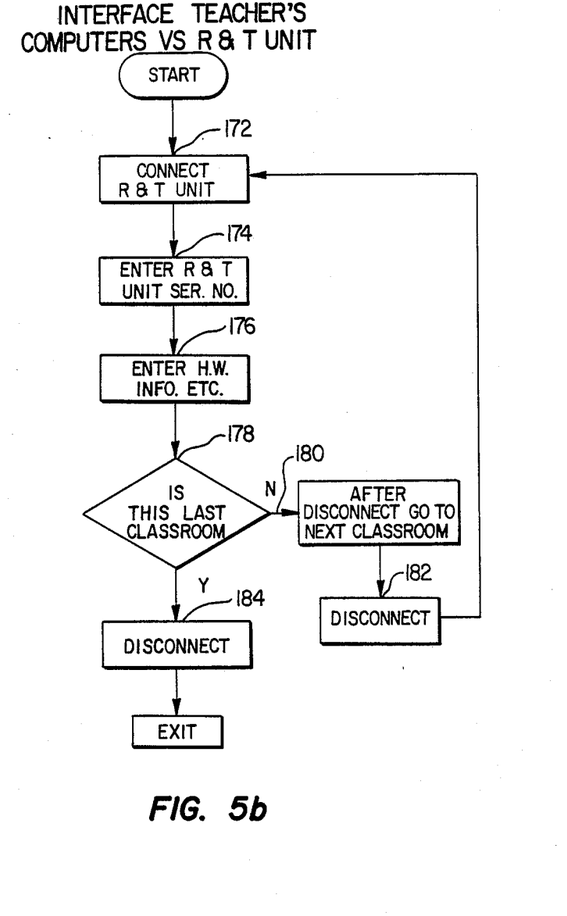

After the R&T units have been issued to the students and with a student logged on to the teacher's computer, the teacher's computer issues an instruction 172 for the student to connect the R&T unit. Then, the teacher's computer issues an instruction 174 for the R&T unit serial number to be entered for student identification. Next, a command 176 is given for the teacher's computer to load the teacher's information including homework assignments, etc. into the R&T unit. THen, the teacher's computer issues a prompt 178 inquiring if this is the student's last classroom. If NO, an instruction 180 is displayed informing the student after disconnect to got to next classroom and repeat. Then an instruction 182 is issued to disconnect. However, if the answer to prompt 178 is YES, an instruction 184 is used to disconnect and exit.

Figure 6:
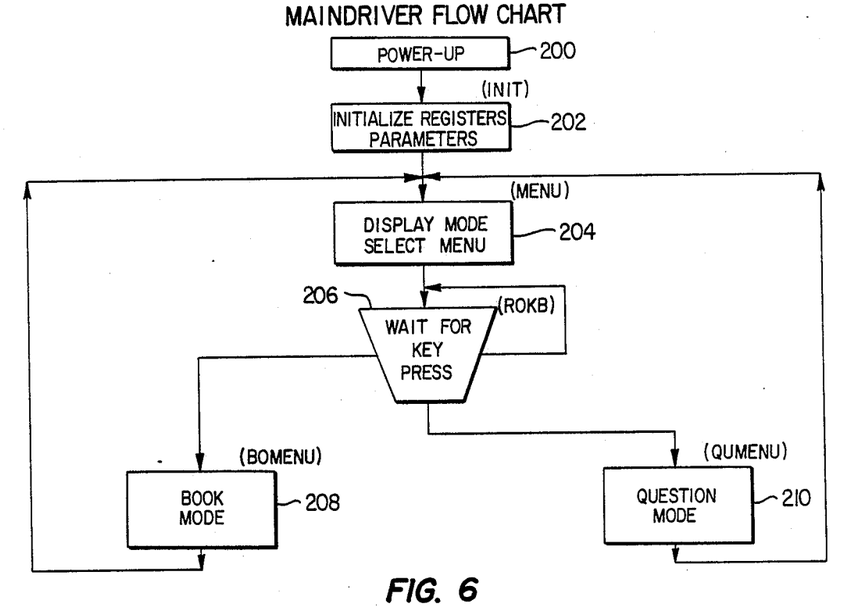
FIG. 6 is a main driver flowchart for R&T unit.

Referring now to the main driver flowchart of FIG. 6, the read and test device is powered up (200) and an instruction 202 issued to initialize the units registers and input operation parameters. Then an instruction 204 is issued to display the mode sheet menu, and await selection pursuant to a prompt of either a book mode or a question mode of operation from the keyboard by pressing the 1 or 2 key respectively, and then pressing the enter key. Thus, a decision 206 is made if a key has been pressed; if FALSE return is made to 206 and repeated until a key has been passed. If TRUE, decision 206 is made whether the book mode 208 has been selected, or the question mode 210 has been selected, or other keys. If the book mode is selected the book mode subroutine is called up, or if the question mode has been selected, the question mode subroutine is called up, or if other keys have been pressed, return is made to step 204 to return to the main menu.

Upon selection of the book mode, the textbook port requirement of the book mode subroutine (FIG. 7) is entered. At start 220 an instruction 222 is issued to initialize all ports to read. Next, an instruction 224 is issued to enter the port parameters of each port, and an instruction 226 issued to scan the keyboard for book selection. In our example, it is assumed six ports are available. Five of the ports (A–E) are for textbooks and the sixth (F) for homework questions. Thus, a book selection is entered at the prompt by pressing a letter (A-F) followed by pressing the enter key. A decision 228 is made as to which one of the six has been selected, and an instruction 230 issued to connect the port for the book selected to the MPU, else if an error is detected an instruction 232 is issued to return to the key scan selection step 226. At any time, exit to the main menu may be made by pressing the mode key (M).

Figure 7:
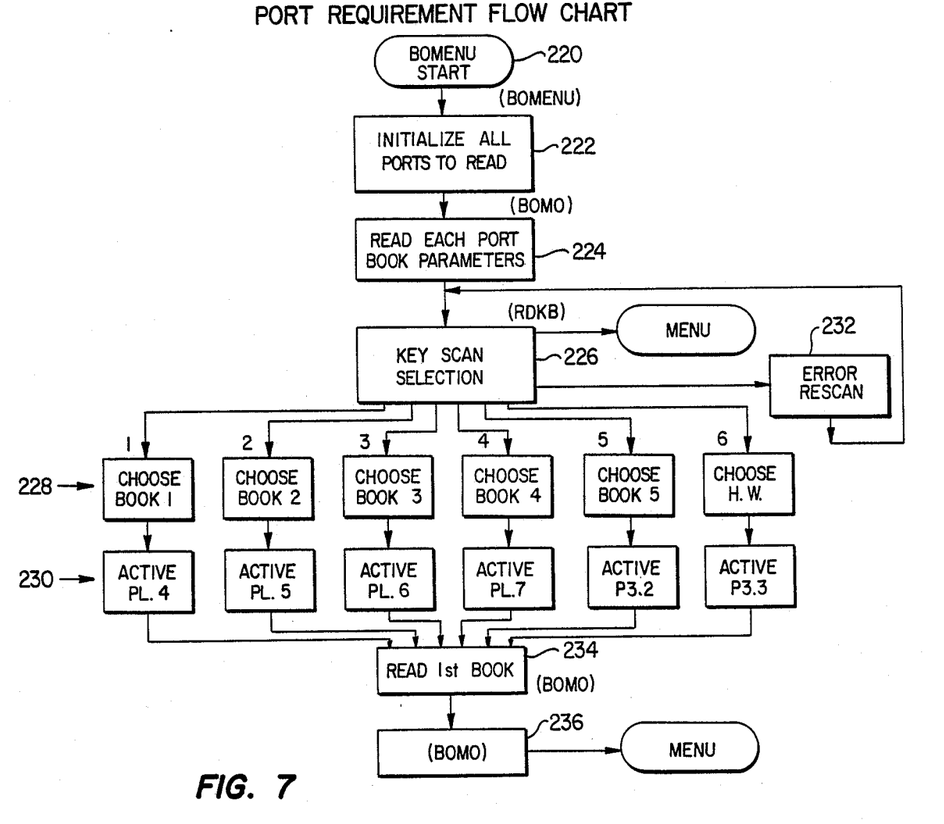
FIG. 7 is a system port requirement flowchart for the electronic book device.

After book selection, an instruction 234 is issued to read into the MPU register for display the first page of the book selected for reading, and then an instruction 236 is issued to enter the book mode reading display subroutine and thereafter exit is made.

The book mode reading display subroutine (FIG. 8a) at start 240 begins with an instruction 242 to display the first page of the book and an instruction 244 is issued to await for a keyboard command entry. Next, a decision 246 is made whether the command entry is a command to turn the page backward, else turn the page forward, or jump to a new page, or skip to a new chapter, or to enter a new mode (return to main menu), or if none of these, including highlighting an instruction 248 is issued pursuant to the key selection to display an error message and to return to step 244 to await a proper command entry. Else exit to the main menu may be made by pressing the mode (M) key.

Figure 8A:
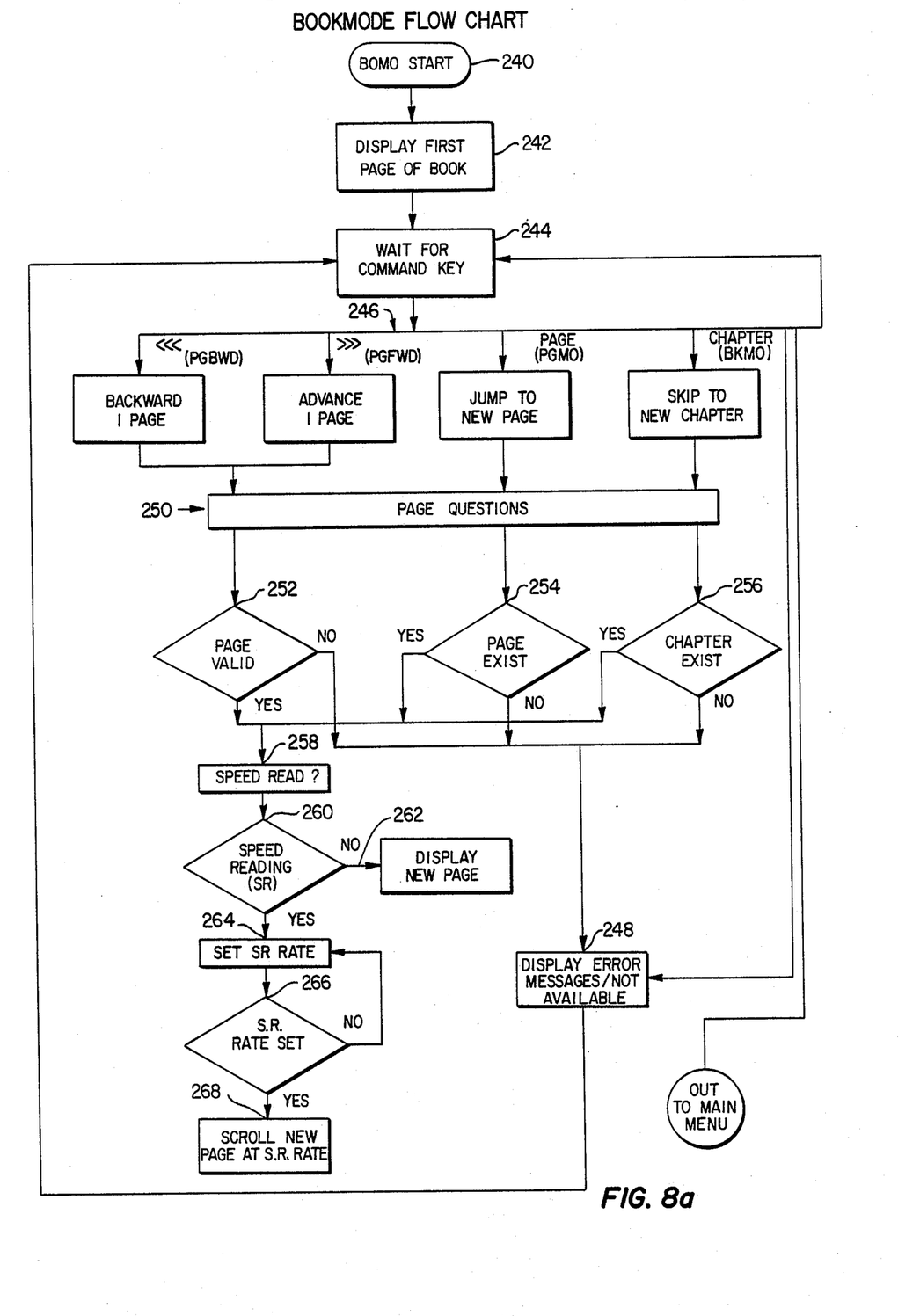
FIG. 8a is a book mode flowchart.

After execution of a valid command, a decision 250 is made whether the selected page is a question page, and if true, the question subroutine is entered. Otherwise, if the command is to turn the page backward or forward a decision 252 is made whether the selected page is valid, else if the command is to jump to a new page a decision 254 is made whether the page exists, or if the command is to skip to a new chapter a decision 256 is made whether the chapter exists. If the decisions 252, 254 and 256 are FALSE, return is made to instruction 248 to display the error message and return to step 244; else a prompt 258 is issued whether speed reading is desired and a decision 260 made whether the answer to the prompt is YES or NO. If NO, an instruction 262 is issued to display the new page and return to instruction 244 to wait for a new command key. If decision 260 is YES, a prompt 264 is issued to set the speed reading rate and a decision 266 is made whether the speed reading rate has been set. If FALSE, return is made to instruction 264 to set the rate. If TRUE, an instruction 268 is issued to scroll the new page at the speed reading rate and return is made to instruction 244 to wait for a new command key. For the new page or chapter selection a two digit page number subroutine (FIG. 8b) is used to input the new page number. A page selection prompt appears at the top of each existing page and a page is selected by pushing the page number then the enter key. The page selection subroutine begins with an instruction 280 being issued to scan the keyboard to determine if an entry has been made, and a decision 282 made whether the entry is a digit 0–9. If TRUE, an instruction 284 is issued to store the first digit and wait for the second number, else a decision 286 is made as to whether the selection was a mode key. If TRUE, exit is made to the main menu; otherwise, return is made to the scan key instruction 280. For the second number, instruction 288 is issued to scan the keyboard for the second entry, and a decision 290 made whether it is a second digit 0–9. If TRUE, an instruction 292 is made to store the second digit, else a decision 294 is made whether to "return" with the single digit. If TRUE, an instruction 296 is issued to return with the digit number to the book mode flowchart for displaying the page; otherwise, a decision 298 is made whether the key pressed was a clear key to clear the digits. If TRUE, return is made to the scan key instruction 280, else a decision 300 is made whether the entry is a mode key. If TRUE, exit is made to the main menu, else return is made to the second scan key instruction 288.

Figure 8B:
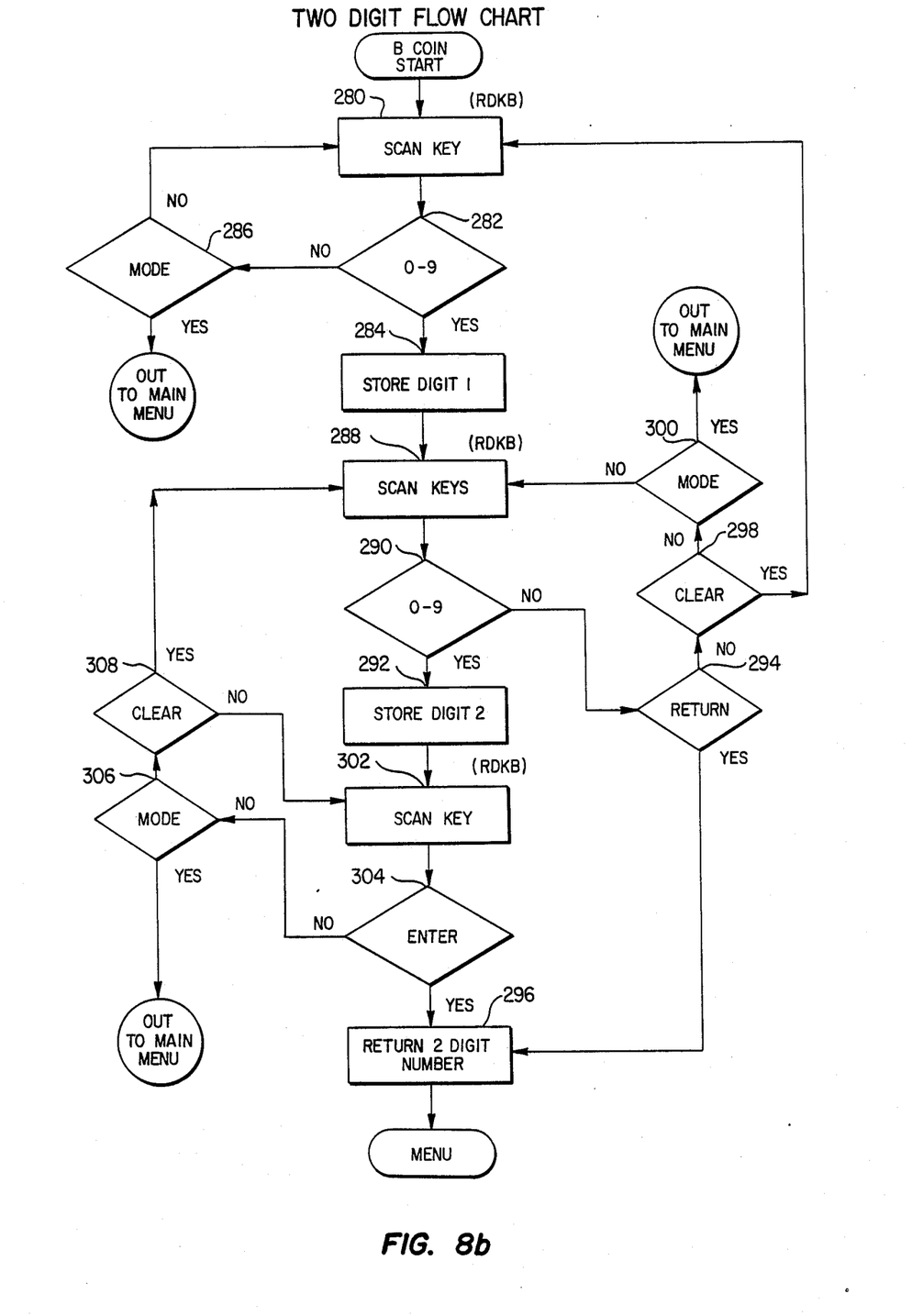
FIG. 8b is a two digit input flowchart.

After storing the second digit pursuant to instruction 292, an instruction 302 is issued to scan the keyboard for another key pressed and a decision 304 made whether it was the enter key. If TRUE, the instruction 296 is issued to return with the 2 digit number to the book mode flowchart (FIG. 8a) for continuation, else a decision 306 is made whether the key pressed is the mode key. If TRUE, return is made to the main menu; otherwise, a decision 308 is made whether to clear. If TRUE, return is made to the scan key instruction 288 for the second digit; otherwise, return is made to the scan key instruction 302 to repeat decision 304 whether the enter key has been pressed. If TRUE, instruction 296 is issued to return the two digit number to the book mode flowchart (FIG. 8a) for continuation.

After moving to the new page, forward or backward, paging is executed from the new page by pressing the forward or backward key. To select a chapter, the chapter key is pressed; after the prompt appears for the chapter number, the chapter number then is stored and entered by pressing the enter key. The first page of the chapter is displayed.

At any time the mode key may be pressed to clear the display and return to the main directory. When the prompt appears, the desired mode number may be pressed and the enter key pressed to enter a newly selected mode.

While any page is being displayed, a highlighting function may be performed by pressing the HL key. When the HL key is pressed an underline appears as a cursor under the first word of the first paragraph on the page. The cursor can then be moved to the first word to be highlighted using keys 2 and 8 for line up and line down, respectively, and by keys 4 and 6 for word left and word right, respectively. Then highlighting can be made either forward or reverse of the word one word at a time using the right, left page keys, respectively.

The display continuously displays the prompt "Do you wish to print highlights". Thus, at any time in the highlight mode the highlighted material can be printed by answering the prompt question "Do you wish to print highlights" by pressing the "Y" key. The device samples the RS-232 to determine whether a printer is present. If not, the prompt "Printer not present" will be displayed. To exit the highlighting mode, the HL key is pressed a second time. With the pressing of the HL key a second time the underline (cursor) goes away, but the highlighted material remains highlighted until exit is made from the book. At that time the highlighting is erased, but the book mode remains on the page from which exist was made.

Figure 8C:
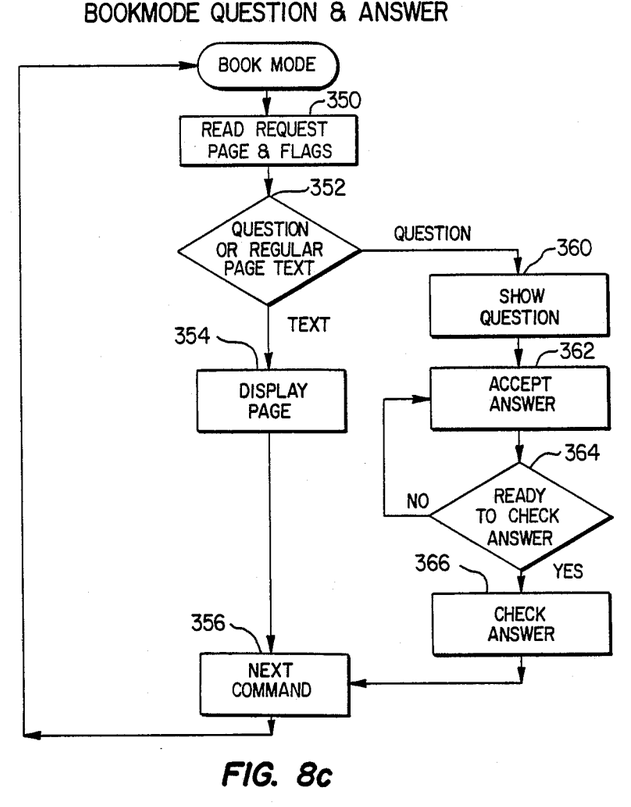
FIG. 8c is a book mode question and answer flowchart.

With the selection of a new page, a subroutine (FIG. 8c) is made whether it is a read page or a question page. The subroutine begins with an instruction 350 to read the newest page and flags. Next, a decision 352 is made whether the page is text or questions. If text, an instruction 354 is issued to display the page and an instruction 356 is issued to wait for the next command and return is made to the book mode. However, if the decision 352 is that the newest page is a question page, an instruction 360 is issued to display the questions for answering and display, and an instruction 362 is issued to accept the answers. Next, a decision 364 is made whether the answers selected are ready for checking. If FALSE, return is made to the accept answer instruction 262; otherwise, an instruction 366 is issued to check the answers and proceed to the next command instruction 356. After completion of the question exercise, return is made to the book mode where it will remain until the test mode of operation is selected. The default mode is the book mode.

In the test mode of operation, the flow chart (FIG. 9a) starts with the question menu 400 and an instruction 402 issued to display the menu. The test mode includes homework questions or test questions and a decision is made whether homework or test is selected by pressing at the prompt "Homework or Test" either the "A" key for homework or the "B" key for test. If homework is selected, a prompt instruction 404 is issued to select a desired port line (homework and open book test questions are stored in RAM, received and turned in through the RS-232. Test are always run hardwired to the teacher's computer (main frame) through the RS-232).

Figures 9A, 10:
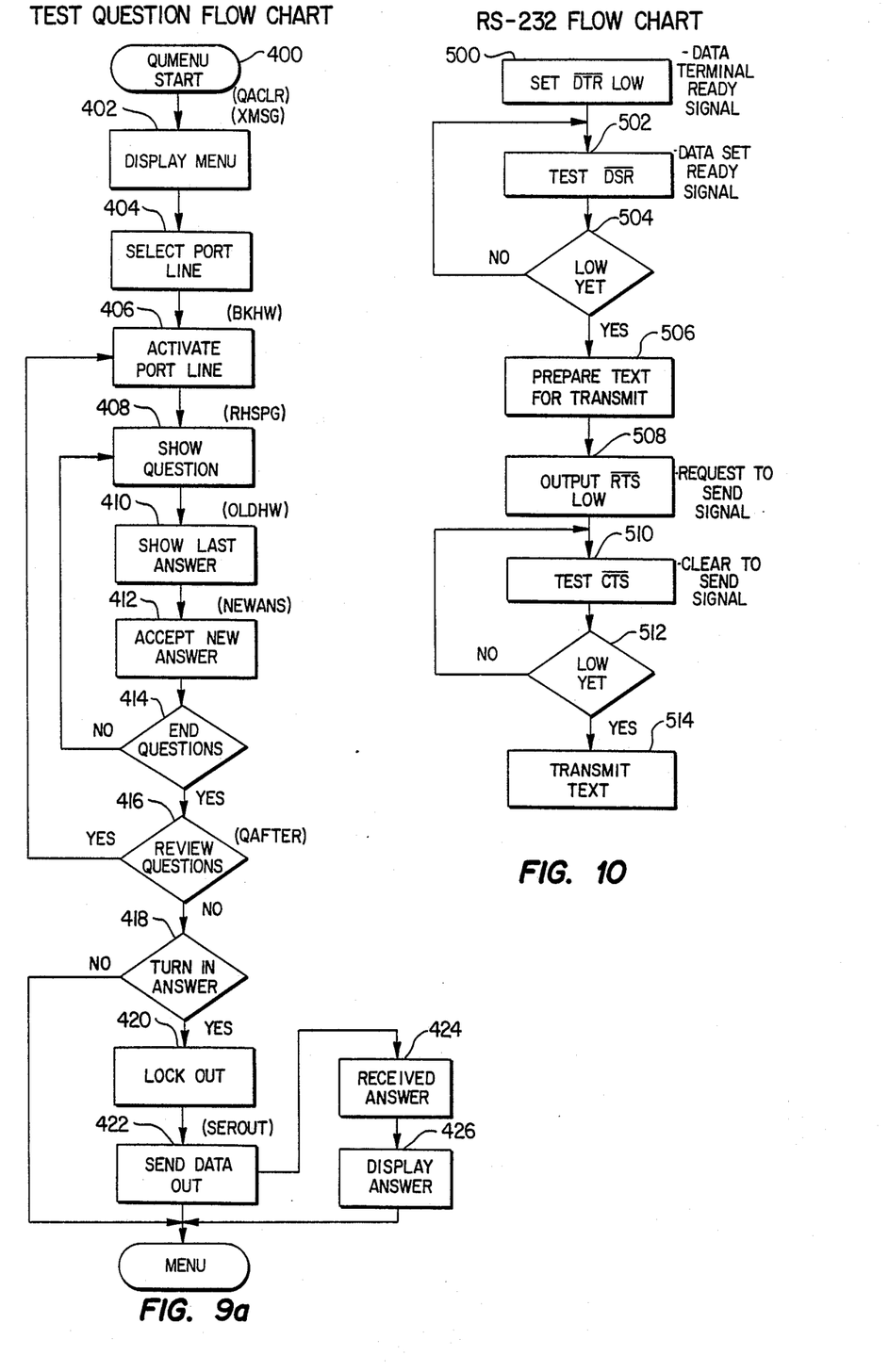
FIG. 9a is a test question and answer flowchart.
FIG. 10 is an R232 communication flowchart.

Next, an instruction 406 is issued to activate the port line and title page information concerning the homework is displayed. Next, an instruction 408 is issued to page right to show the question, multiple choice answers and prompt for answering and entry. After entry, an instruction 410 is issued to display the last answer. Next, an instruction 412 is issued to accept the answer, and a decision 414 made whether all the questions have been answered. If FALSE, return is made to instruction 408 to show the next question; else, a decision 416 is made whether to review the questions and answers. If TRUE, return is made to instruction 406 to activate the port line for reviewing the questions and answers in sequence for answer changing; else a decision 418 is made whether to turn in the answers. If TRUE, an instruction 420 is issued to lock out the questions and answers; else to return to the menu for further action. (Paging past a previously answered question doesn't change the answer). Then, an instruction 422 is issued to send data out to the teacher's computer and wait for answers. Next, a flag 424 is issued indicating the receipt of the answers, and an instruction 426 is issued to display the answers and return to menu.

Figure 9B:
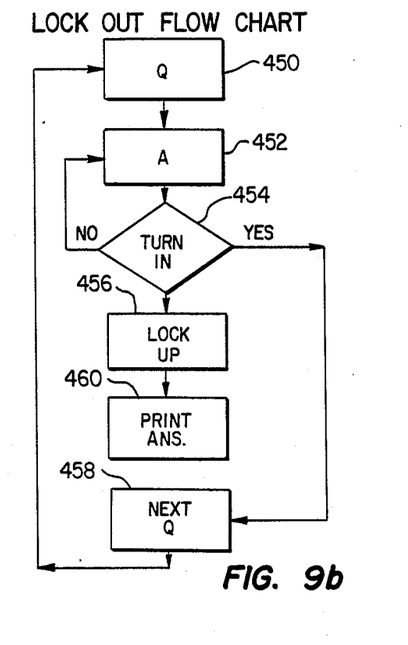
FIG. 9b is a test answer lock out flowchart.

The lock out subroutine (FIG. 9b) starts with instructions 450 and 452 being issued to enter the questions and answers, respectively, one by one. These instructions are followed by a decision 454 whether to turn in the answer. If FALSE, return is made to the answer instruction 452 to review of the answer; otherwise an instruction 456 is issued to lock up the answer and an instruction 458 issued to call up the next question and return to step 450. After lock up, an instruction 460 is issued to print the answer to the question. As each question is printed, return is made to test question routine to send out the answer to the teacher computer.

The test selection works exactly the same as the homework with the exception that it is only active while connected to the teacher's computer via the RS-232.

The RS-232 communication control (handshake) flowchart (FIG. 10) starts with an instruction 500 to set the data terminal ready signal low. Then an instruction 502 is issued to test the data set ready signal, and a decision 504 made whether the signal is low. If TRUE, an instruction is issued to prepare text for transmit; otherwise, return is made to the instruction 502 to test data set ready signal. Next, an instruction 508 is issued to output a request to send signal. Then, an instruction 510 is issued to test the clear to send signal, and a decision made whether the clear to send signal is low yet. If TRUE, an instruction 514 is issued to transmit text; otherwise, return is made to the instruction to test the clear to send signal.

Although only a single embodiment of the invention has been described, it will be apparent to a person skilled in the art that various modifications to the details of construction shown and described may be made without departing from the scope of this invention.

What is claimed is:

1. An electronic school teaching system comprising:
a data collection computer, a teacher's computer, and a plurality of read and test (R&T) devices;
The data collection computer for location at an administrative office and having information input-/output means connected to the teacher's computer for issuing command signals for collecting school related data including attendance and grade data;
the teacher's computer for location at a classroom remote to the administration office and outputting the requested school related information responsive to the command of the data collection computer, the teacher computer having a grading means, and an input/output means for inputting teacher generated information including homework assignments, and test questions for computer distribution to students and inputting student identification and responses to teacher generated information for grading by the grading means, and outputting information including class attendance information, and homework and test grades for the teacher; and
the plurality of read and test (R&T) devices being portable electronic read and test (R&T) devices each having: a connector, a plurality of modules including a textbook module and a data storage module, a keyboard, a display, an input/output means, and a control means including a control storage means, said connector for selectively connecting the input/output means to the teacher's computer for inputting identification information or attendance reporting and receiving and storing the teacher information in the data storage module and disconnecting the R&T device from the second computer for removal of the device from the classroom for doing this homework; said modules, keyboard, display, and control storage means connected to the control means wherein the control means responsive to keyboard command selectively displays the homework assignment, the pages of text, the test questions, and answers to the questions for selection, and stores the homework and test question answers in the control memory for subsequent entry into the teacher's computer when again connected by the connector to the teacher's computer for grading and for receipt of any answer correction and grades.

2. An electronic school teaching system comprising:
first and second computer means, and a read/test (R&T) device each having input/output means; the first computer means input/output means connected to terminals of input/output means of the second computer for the collection and dissemination of school administration data; a connector means having portions thereof connected to terminals of the input/output means of the second computer and corresponding portions connected to terminals of the input/output means of the R&T device for detachably connecting the second computer to the R&T device for exchanging communications when attached;
said second computer further including data entry means for inputting classroom related information including homework assignment and questions for homework and tests commensurate with the learning skills of each student;
said R&T device having a control means and a plurality of detachable electronic modules including a module containing textual information arranged in a preselected format compatible with the R&T device operation commands and a homework module for receiving the classroom related information when the R&T device is connected to the second computer, a keyboard means, a display means and an information storage means connected to the control means, said control means responsive to programmed instructions and keyboard generated commands for selectively displaying the homework assignment, the textual material for the homework assignment, the questions and possible answers for reading and answer selection, and storing the selected answers for input together with student identification information to the second computer when connected thereto;
said second computer further including a grading means for grading the selected answers, outputting the correct answers and grade to the R&T device, and a recording means for recording the identification information and grades for output to the first computer.

3. An electronic school teaching system comprising:
a data collection computer and a plurality of teacher computers located, respectively, at an administration office and a plurality of separate classrooms, the data collection computer having an input and output means connected to the plurality of teacher computers for transmitting commands thereto and for retrieving information; said plurality of teacher computers having first information input and output means connected to the data collection computer for receiving the commands and in response thereto transmitting information to the data collection computer, means for receiving teacher generated information including preselected homework assignments and tests for distribution to students, grading means for grading student response to the homework assignments and test, and means for producing information including attendance and grades for the teacher and data collection computers; and input and output means for receiving student generated class attendance information for recording, and homework information and test answers for grading and recording and outputting information including correct answers and grades; and a plurality of portable electronic read and test (R&T) devices for selective connection to the plurality of teacher computers, each device having: a control storage means and a plurality of modules including a plurality of electronic textbook modules and an information storage module, a display means, a keyboard means, and a control storage means having a storage means for storing information including attendance, and student homework and test answers, all of said modules and means operatively connected to the control means; and a removable connector means for removably connecting the device to the teacher computer for each class in order of attendance for receiving and storing in the storage module the teacher information for each class including the homework assignments and test information and for outputting information including attendance, homework, and test information from the control storage module into the teacher's computer for each class, and wherein the device may be disconnected from a teacher's computer for transport to each classroom for connection to each teacher computer for receiving the information and for transport to a work station outside the classrooms for doing and storing the homework and test answers in the control storage means for subsequent input into the plurality of teacher computers.

4. An electronic school teaching system according to claim 3 wherein the read and test (R&T) device comprises a housing having a depth commensurate to that of a textbook for convenient handling, a display having a size substantially that of an open textbook surrounded by a keyboard frame a size substantially equal to page margins of a textbook, the keyboard frame having a plurality of conveniently arranged keys including page turning keys located, respectively, in the upper right and left hand corners of the frame for paging the textbook display forward and backward, number keys for selecting pages for display, letter keys for textbook selection and answering multiple choice questions, and keys for answering true/false and yes/no type questions whereby the physical operation of the R&T device is substantially that normally used in connection with textbooks.

5. An electronic school teaching system according to claim 4 wherein the number keys are located in the right side of the frame.

6. An electronic school teaching system according to claim 4 wherein the letter keys are located in the left side of the frame.

7. An electronic school teaching system according to claim 4 wherein at least some of the keys are question answering keys located in the lower side of the frame.

8. An electronic school teaching system according to claim 3 wherein the electronic textbook module of the R&T device includes a textbook having a preselected format and the keyboard means includes keys compatible with the preselected format of the textbook wherein the manipulation of the keyboard allows for textbook study, homework preparation and question answering.

9. An electronic school teaching system according to claim 3 wherein the plurality of electronic textbook modules each comprise a semiconductor device into which a textbook has been copied for subsequent recovery.

10. An electronic school teaching system according to claim 9 wherein the semiconductor device into which the textbook has been copied is adapted for changing the content of the device while retaining read only characteristics.

11. An electronic school teaching system according to claim 9 wherein the semiconductor device is a memory selected from the group consisting of a ROM, DRAM, EPROM, and EEPROM.

12. An electronic school teaching system according to claim 3 wherein the R&T device control means includes an instruction means, the control means being responsive to the instruction means for displaying a directory of the content of the plurality of modules and of the various operation modes together with a mode selection prompt for keyboard entry.

13. An electronic school teaching system according to claim 12 wherein after book mode selection the control means generates in response to the instruction means a book selection prompt for a keyboard entry and for displaying the first page of the selected book.

14. An electronic school teaching system according to claim 13 wherein after book selection the control means is responsive to keyboard selection for selectively displaying the first page of any chapter and any selected page.

15. An electronic school teaching system according to claim 14 wherein the control means is responsive to keyboard selection for selectively displaying each succeeding page and each previous page, successively.

16. An electronic school teaching system according to claim 14 wherein the central means is responsive to keyboard entry for highlighting selected material of the display.

17. An electronic school teaching system according to claim 16 wherein the control means is responsive to keyboard entry for determining the connection of a printer and if connected for printing the highlighted material for note taking.

18. An electronic school teaching system according to claim 13 wherein after book mode selection is made the control means issues a prompt to a speed reading selection and a desired speed rate selection.

19. An electronic school teaching system according to claim 12 wherein the control means is responsive to a keyboard selection for exiting the existing mode and displaying a directory together with a mode selection prompt.

20. An electronic school teaching system according to claim 12 wherein the control means is responsive to keyboard selection for returning for display the book directory and the select mode directory, and is responsive to an instruction means instruction for generating a mode selection prompt.

21. An electronic school teaching system according to claim 20 wherein the control means is responsive to keyboard selection for entering a question mode and is responsive to the instruction means for displaying a homework (HW) or test selection prompt.

22. An electronic school teaching system according to claim 21 wherein the control instruction means is responsive to keyboard homework selection for issuing a module selection prompt.

23. An electronic school teaching system according to claim 22 wherein the control means is responsive to keyboard selection for displaying the title page of the content of the selected module, and thereafter is responsive to keyboard selection for paging through the questions for display.

24. An electronic school teaching system according to claim 23 wherein the questions displayed have a preselected format including argument, questions related to the argument and prompts for the answers.

25. An electronic school teaching system according to claim 24 wherein the control means displays a prompt for reviewing the questions together with a prompt for turn in pursuant to an instruction of the instruction means issued after the last question.

26. An electronic school teaching system according to claim 25 wherein the control means in response to a turn in keyboard instruction locks in the question answers against change for turn in to the teacher computer.

27. An electronic school teaching system according to claim 21 wherein the control means is responsive to keyboard selection of the test mode for making a decision whether the teacher computer is connected and for issuing a warning when not connected.

28. An electronic school teaching system according to claim 27 wherein the R&T device receives the test questions directly from the teacher computer, and the control means in response to an instruction displays the questions for answering, review, and turn in.

29. An electronic school teaching system according to claim 28 wherein the control means in response to turn in selection locks in the answers against change.

30. An electronic school teaching system according to claim 28 wherein the control means in response to an instruction to display the first test question issues an instruction to start a timer and locks in the answers in response to time up signal or a turn in signal, whichever first occurs.

31. An electronic school teaching system according to claim 12 wherein the control means is responsive to connection to a teacher computer for inputting student identification information to the teacher's computer.

32. A method of school instruction consisting of the steps of:
(a) entering into a teacher's computer located in a classroom a list of students enrolled in each class of a subject taught in the classroom;
(b) entering into the teachers' computer subject related material including a plurality of homework assignments of varying degrees of difficulty, and homework questions and answers;
(c) coupling for each student homework assignments, homework questions, and answers commensurate with the learning skills of the student from those entered into the teacher's computer;
(d) reading identification information into the teacher's computer and writing the homework assignments, homework questions and answers into a student controlled read and test (R&T) device when connected to the teacher's computer;
(e) calling up the homework assignment for display by the R&T device when detached from the teacher's computer;
(f) calling up the assigned text from electronic textbooks of the R&T device for student study;
(g) calling up the homework questions for answering;
(h) entering answers for the homework questions into the R&T device;
(i) reading the answers into the teacher's computer when the R&T device is connected for grading by the teacher's computer; and
(j) storing the grade for the student in the teacher's computer.

33. A method of school instruction according to claim 32 wherein the steps:
a-c are repeated in a plurality of classrooms for each subject of the school curriculum and wherein the R&T device is transported to each classroom for the courses enrolled in by a student and steps d-j repeated for each course.

34. A method of school instruction according to claim 33 further including the step of timing the test period and automatically locking the answers into the teacher's computer at the end of the time period or upon receipt of a locking command from the R&T device whichever first occurs.

35. A method of school instruction according to claim 32 further including the steps of:
entering into the teacher's computer test questions of varying degrees of difficulty and answers for the subject;
compiling for each student test questions commensurate with the learning skills of the student and answers from those entered into the teacher's computer;
reading the test questions into a student R&T device when connected to the teacher's computer one at a time for answering; and
performing the following steps with the R&T device connected to the teacher's computer;
entering answers to the questions one at a time into the R&T device;
reading the student answers one at a time into the teacher's computer;
locking the student's answers against change in the teacher's computer upon receipt of a command from the R&T device; and reading the answers one at a time into the R&T device for display.

36. A method of school instruction according to claim 32 further including the step of reporting to a data collection computer the attendance and grades of each student upon a command received from the data collection computer.

37. A method of school instruction according to claim 32 wherein the step of calling up the assigned text from textbooks of the R&T device for student study further includes highlighting portions of the text for printing.

* * * * *